United States Patent [19]
Marks et al.

[11] Patent Number: 6,075,103
[45] Date of Patent: *Jun. 13, 2000

[54] SILYL-TERMINATED POLYMER AND METHOD FOR PREPARING SILYL-TERMINATED POLYOLEFINS

[75] Inventors: Tobin J. Marks, Evanston; Kwangmo Koo, Wilmette, both of Ill.

[73] Assignee: Northwestern University, Evanston, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/874,188

[22] Filed: Jun. 13, 1997

[51] Int. Cl.⁷ ........................................ C08F 4/64
[52] U.S. Cl. .................... 526/127; 526/160; 526/161; 526/82; 526/83; 526/84

[58] Field of Search ...................... 526/127, 160, 526/82, 83, 84

[56] References Cited

U.S. PATENT DOCUMENTS

| | | | |
|---|---|---|---|
| 5,096,867 | 3/1992 | Canich | 526/160 |
| 5,494,874 | 2/1996 | Rosen et al. | 502/155 |
| 5,552,358 | 9/1996 | Speca | 526/129 |
| 5,578,690 | 11/1996 | Marks et al. | 526/160 |
| 5,672,669 | 9/1997 | Wasserman et al. | 526/160 |

*Primary Examiner*—David W. Wu
*Assistant Examiner*—Caixia Lu
*Attorney, Agent, or Firm*—Welsh & Katz, Ltd.

[57] ABSTRACT

There is disclosed a method for synthesizing polyolefins having a silyl group at one terminus, the method comprising reacting a monomer of an α-olefin (C≦3≦10) and a tetrasubstituted silyl radical in the presence of a metallocene catalyst.

15 Claims, No Drawings

SILYL-TERMINATED POLYMER AND METHOD FOR PREPARING SILYL-TERMINATED POLYOLEFINS

This invention is made with government support under Grant No. CHE 910 4112 awarded by the National Science Foundation. The government has certain rights in the invention.

FIELD OF THE INVENTION

The present invention relates to a method for the preparation of silyl-terminated polyolefins. More particularly, the invention relates to a method for synthesizing polyolefins having a silyl group at one terminus, said method comprising polymerizing α-olefins in the presence of a metallocene catalyst using a silane as a chain transfer agent.

BACKGROUND OF THE INVENTION

Catalyst systems for the polymerization of olefins are well known in the art. Typically, these systems include a Ziegler-Natta type polymerization catalyst; a co-catalyst, usually an organoaluminum compound; an electron donor compound (optional), and an olefin monomer. Control of molecular weight is important as it influences the final physical properties of the polymer. The molecular weight is controlled by chain transfer reactions which terminate the growth of the polymer chains. A number of such chain transfer processes, including β-H elimination, β-alkyl elimination and chain transfer to $MR_n$ (M=Zn, Al, etc.), monomer, and hydrogen have been identified. Of these, hydrogen has been found to be the most practical chain transfer agent since it is generally easy to use and normally does not affect the activity of the catalyst. However, there are many cases where even hydrogen does not provide the optimum results due to some undesired side effects (e.g., unresponsive M—R bonds, overactivation of the catalyst, too rapid hydrogenation of other functional groups). Therefore, alternative chain transfer agents for use in the production of polyolefin homopolymers and copolymers, are highly desirable.

Terminally functionalized polymers are of great current interest. Such a polymer could be used as precursor for making block or graft polymers and would be expected to exhibit modified chemical and physical properties.

It has previously been disclosed in U.S. Pat. No. 5,578,690 that certain silanes can be used as chain transfer agents when ethylene, or a combination of ethylene and an α-olefin, is polymerized with certain metallocene catalysts. There the method resulted in an ethylene polymer, or co-polymer of ethylene and an α-olefin, having a silyl group at one terminus of its chain. Unfortunately, this organolanthanide polymerization system is limited to ethylene polymerization and copolymerization and cannot be expanded to homopolymers of higher α-olefins.

SUMMARY OF THE INVENTION

Accordingly, it is an object of the subject invention to prepare and utilize a new class of olefin polymerization catalysts.

A further object of the subject invention is a catalyst which permits better control over molecular weight and molecular weight distribution of such polymers of higher α-olefins.

Another object of the subject invention is a Ziegler-Natta type catalyst system which reduces the use of excess co-catalyst.

These and other objects are attained in the subject invention whereby in one embodiment there is a method to produce silyl-capped polyolefins and the silyl-capped polyolefins thereby prepared. This method includes polymerization of α-olefins with silanes as chain transfer reagents using group 4 Ziegler-Natta homogeneous catalysts. The method involves reacting α-olefins (C≧3), catalyzed by group 4 metal catalysts in hydrocarbon solvents in the presence of a silane having the formula $R(SiR^2R^3R^4)_n$, wherein R is H, a hydrocarbon (1≦C≦10) or silyl group each having a valence equal to or and, at least, one of $R^2$, $R^3$ and $R^4$ is H and the other of $R^2$, $R^3$ and $R^4$ may be a monovalent group independently selected from the group consisting of: hydrogen, alkyl radicals, aryl radicals, alkylaryl radicals, arylalkyl radicals, alkoxy radicals (1≦C≦20); phenoxy radical, fluorinated alkyl radicals (3≦C≦6), dialkylamino group in which the alkyl groups contain 1 to 4 carbon atoms, a diorganopolysiloxane chain containing 1 to 10 siloxane units and n=1-6 and when R is H, n is 1.

DETAILED DESCRIPTION OF THE INVENTION

The primary component of the present invention is selected from an α-olefin (C≧3) or a combination of two or more such α-olefins. Specific examples of suitable α-olefins include styrene, propene, 1-butene, 1-pentene, 1-hexene, and 1-octene.

Another component of the instant method is a silane having the formula

 (i)

wherein R is H, a hydrocarbon, or silyl group each having a valence equal to n and at least one of $R^2$, $R^3$, and $R^4$ is H, and the other of $R^2$, $R^3$ and $R^4$ is a monovalent group independently selected from the group consisting of: hydrogen, alkyl radicals, aryl radicals, alkylaryl radicals, arylalkyl radicals, alkoxy radicals (1≦C≦20); phenoxy radical, fluorinated alkyl radicals (3≦C≦6), dialkylamino group in which the alkyl groups contain 1 to 4 carbon atoms, a diorganopolysiloxane chain containing 1 to 10 siloxane units and n=1-6 and when R is H, n is 1.

More specifically, R, $R^2$, $R^3$ and $R^4$ each may represent a monovalent group independently selected from hydrogen, halogen, alkyl radicals having 1 to 20 carbon atoms, aryl radicals such as phenyl and tolyl, alkylaryl radicals such as ethylphenyl and ethyltolyl, arylalkyl radicals such as phenylethyl and benzyl, alkoxy or amide radicals having 1 to 20 carbon atoms, phenoxy radicals, fluorinated alkyl radicals having 3 to 6 carbon atoms such as 3,3,3-trifluoropropyl, a dialkylamino group in which the alkyl groups contain 1 to 20 carbon atoms and a diorganopolysiloxane chain containing 1 to about 10 siloxane units in which the organic groups are independently selected from alkyl radicals having 1 to 6 carbon atoms, aryl radicals, fluorinated alkyl radicals, silyl groups or alkoxy radicals having 1 to 4 carbon atoms.

Preferred groups which are bonded to the silicon atom of the above formula (i) include hydrogen, methyl, ethyl, isopropyl, isobutyl, phenyl, methoxy, ethoxy, chlorine, 3,3,3-trifluoropropyl, dimethylamino and siloxane groups of the formula

 (ii)

in which R' is independently selected from methyl, phenyl, 3,3,3-trifluoropropyl, methoxy or ethoxy groups and j has a value of 0 to 10. Highly preferred silanes, according to the instant method, are phenylsilane, diphenylsilane, phenylmethylsilane, pentamethyldisiloxane, methylsilane, and dimethylsilane.

The catalyst is selected from a metallocene catalyst or a metallocene catalyst in combination with a co-catalyst. The metallocene catalyst of the invention has a general composition of $Cp_mMX_nY_p$ or $C_pMX_d$ and a co-catalyst, where the catalyst is typically a constrained geometry catalyst:

(iii)

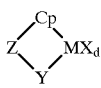

wherein Cp denotes a cyclopentadienyl, a substituted cyclopentadienyl radical, or a fused cyclopentadienyl radical, such as an indenyl radical.

Examples of substituted Cp groups include $C_5R^*_4$, in which $R^*$ is selected from the group consisting of hydrogen, alkyl having 1 to 20 carbon atoms, aryl having 6 to 18 carbon atoms and triorganosilyl, such as trimethylsilyl. A specific Cp group includes tetramethylcyclopentadienyl ($Cp'=\eta^5-C_5Me_4$), wherein Me hereinafter denotes a methyl radical and $\eta^5$ indicates pentahapto coordination to the metal.

Further:

M is a metal of group 3, 4, 5, 6, 7, 8, 9, 10 or an element of the actinide or lanthanide groups, and preferably Ti, Zr or Hf;

X is an inert anionic ligand ($C \leq 20$);

Y is a heteroatom ligand, such as —O—, —S—, —NR*—, —PR*— or a neutral two electron donor ligand such as —CR*, —SR*, —NR*$_2$, and —PR*$_2$;

Z is $SiR^*_2$, $CR^*_2$, $SiR_2SiR^*_2SiR^*_2$, $CR^*_2CR^*_2$, $CR^*=CR^*$, $CR^*_2SiR^*_2$, $GeR^*_2$, $SnR_2^*$, wherein:

R*, each occurrence, is independently selected from the group consisting of hydrogen, alkyl, aryl, silyl, halogenated alkyl, halogenated aryl groups having up to 20 carbon or non-hydrogen atoms, and mixtures thereof, or two or more R* groups from Y, Z or both Y and Z form a fused ring system.

m, n and p are independent;

p is 0, 1 or 2;

m is 0, 1, 2 or 3; n is 1, 2, 3 or 4;

the sum of m and n is equal to the valence of M;

d is 1 or 2;

The co-catalyst may be weakly acidic and can be any of the compatible, noncoordinating or weakly coordinated anions (preferably $BR^-_4$), organo-Lewis acids, preferably $BR^*_3$, methylalumoxane (MAO) and $AlX_qR^*_{3-q}$, etc., wherein R* independently is alkyl or aryl or substituted aryl, X is a halogen, $0 \leq q \leq 3$.

It should be noted that whereas formula iii and the following formulas indicate a cyclic structure for the catalysts, when Y is a neutral two electron donor ligand, the bond between M and Y is more accurately referred to as a coordinate-covalent bond. Also, it should be noted that the complex may exist as a dimer or higher oligomer.

Specific examples of the above metallocene catalysts include compounds having the following formulas, in which Me, Cp' and Cp" have their previously defined meanings:

| | | |
|---|---|---|
| Me$_2$SiCp"(t-BuN)TiMe$_2$ | Cp'ZrMe$_3$ | rac-C$_2$H$_5$(Indenyl)$_2$TiMe$_2$ |
| Me$_2$SiCp"(t-BuN)HfMe$_2$ | Cp'TiMe$_3$ | Cp' = $\eta^5$—C$_5$Me$_4$ |
| Me$_2$SiCp"(t-BuN)ZrMe$_2$ | Cp'HfMe$_3$ | Cp' = $\eta^5$—C$_5$Me$_5$ |

The above described catalysts are known in the art and they may be employed in particulate form, as a homogeneous solution or supported on inert materials such as alumina, methylalumoxane-activated silica, silica, silica-alumina and magnesium chloride, inter alia. They may be prepared by e.g., methods taught by Den Haan et al. in *Organometallics*, vol. 5, 1726–33, 1986; Möhring et al. in *Journal of Organometallic Chemistry* vol. 479, 1–29, 1994; U.S. Pat. Nos. 4,871,705 and 5,001,205 to Hoel; U.S. Pat. Nos. 4,801,666 and 4,668,773 to Marks and by Marks et al. in *Journal of the American Chemical Society*, vol. 107, 8091–8103, 1985.

For the purposes of the present invention, a co-catalyst is also added when m=1, p=0, and n=3 and when M=Ti, Zr or Hf. This co-catalyst is used, for example, to activate the metallocene catalyst and may be selected from alkylalumoxanes, trialkyl boron compounds in which the alkyl radicals have 1 to 8 carbon atoms or triaryl boron compounds in which the aryl radicals have 6 to 8 carbon atoms or borate reagents such as $R'_3NH^+BR^-_4$ or $Ph_3C^+BR^-_4$ where R' is an alkyl, aryl group or perfluoroaryl group. A highly preferred co-catalyst is methylalumoxane (MAO). Certain co-catalysts, such as MAO, also act as oxygen scavengers and desiccants and are beneficial for these functions as well. Alternatively, the co-catalyst can be a compound having the formula $AlG_kR^6_{(3-k)}$ in which G is selected from hydrogen, halogen, alkyl radicals having 1–8 carbon atoms or aryl radicals having 6 to 8 carbon atoms, $R^6$ is an alkyl radical having 1–8 carbon atoms and k is an integer having a value of 0 to 3.

Various metallocene catalysts which require a co-catalyst are described in above-cited U.S. Pat. Nos. 4,871,705 and 5,001,205 to Hoel, the disclosures of which are hereby incorporated by reference. Particularly, catalysts wherein X=halogen require a co-catalyst, MAO is preferably used in combination therewith.

Based on the instant disclosure and the patent as well as scientific literature, those skilled in the art will readily identify circumstances wherein a co-catalyst is desirable by routine experimentation (e.g., based on rate of reaction, polymer yield and molecular weight).

In a preferred embodiment of the instant method, the catalyst and silane are first mixed, preferably in a non-polar hydrocarbon solvent, such as toluene, butane, pentane, hexane, octane and iso-octane, for example. Preferably the solvent is toluene. Alternatively, the silane itself can act as a solvent if a low molecular weight polymer is desired. The above mixing operation must avoid the introduction of moisture or oxygen. The latter condition may be satisfied by running the reaction under an inert atmosphere, such as nitrogen or argon, as is standard in the art.

The α-olefin (or a mixture of an α-olefin and another different α-olefin) is introduced while the ingredients are vigorously agitated and the polymerization reaction is carried out at a temperature of about −100° C. to +200° C., preferably −20° C. to +150° C. The pressure during polymerization is typically controlled at 1 to 100 atmospheres, preferably 1 to 5 atmospheres, and is determined by temperature in a closed system or by the pressure of the volatile components in a continuous polymerization. When a second α-olefin having a boiling point above the reaction conditions is used, it may be added simultaneously with the first α-olefin. When the silane is a gas under the reaction conditions, it may also be added simultaneously with the α-olefin in the desired ratio to produce the silyl-terminated polymer or co-polymer. Upon completion of the reaction, the silyl-terminated polymer sometimes precipitates out of solution when a solvent is used. The polymer can also be recovered by evaporating the solvent. If the reaction is to be carried out without the use of a solvent (e.g., in a gas phase reaction using a supported catalyst), the reaction temperature is preferably adjusted such that the silane and α-olefin are both gases. In this case, the mixture of α-olefin and silane is exposed to the catalyst and the polymer formed may be removed as a melt from the bottom of the reactor. The polymer or copolymer may be purified by re-precipitation or by some other conventional technique.

The above polymerization reaction may be summarized by the following generalized equation:

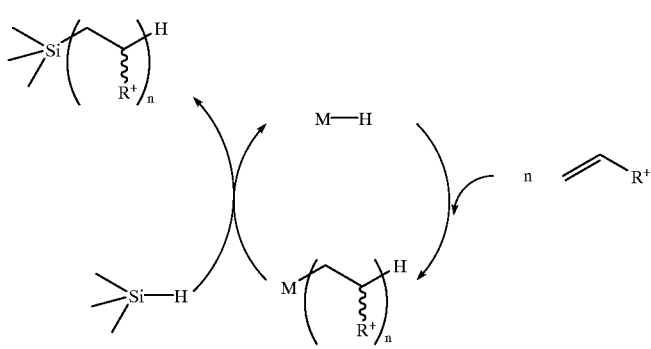

wherein where R is H, a hydrocarbon or silyl group, and M is a metal, as previously defined n represents the average degree of polymerization. Although the inventors of the instant method do not wish to be bound by a particular mechanism or theory, it is believed that, at least for the lanthanide catalysts and titanium constrained geometry catalysts of the invention, the chain transfer step involves the transfer of the polyolefin to the silicon moiety and the molecular weight of resulting polymer is controlled by the concentration of silane chain transfer reagent and the simultaneous regeneration of active catalyst, which readily participates in the next catalytic cycle. This is best shown in Table 1.

(iv)

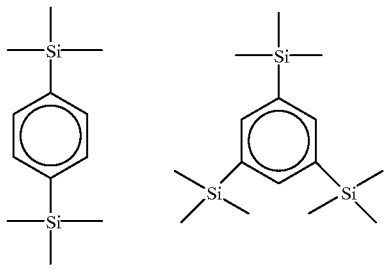

or $R(SiR^2R^3R^4)_n$ in which R, $R^2$, $R^3$, and $R^4$ are defined as above.

TABLE I

Propylene and 1-Hexene Polymerization; Ethylene 1-Hexene and Ethylene-Styrene Copolymerization in the Presence of [Me$_2$Si:(Me$_4$C$_5$)(t-BuN)]TiMe$^+$B(C$_6$F$_5$)$_4^-$ and PhSiH$_3$

| Entry | Time/Temp. | monomer (1 atm) | comonomer (M) | PhSiH$_3$ (M) | Polymer yield | comonomer incorp(M %) | $M_n^b$ | $M_w^b$ |
|---|---|---|---|---|---|---|---|---|
| 1 | 3 min/25° C. | propylene | | 1.13 | 3.2 g | | 890 | 4,500 |
| 2 | 2 min/25° C. | propylene | | 0.73 | 3.8 g | | 1,100 | 4,800 |
| 3 | 3 min/25° C. | propylene | | 0.41 | 2.5 g | | 3,500 | 7,900 |
| 4 | 3 min/25° C. | propylene | | 0.24 | 3.0 g | | 3,800 | 9,400 |
| 5 | 3 min/25° C. | propylene | | 0.080 | 4.0 g | | 11,000 | 95,000 |
| 6 | 2 min/25° C. | propylene | | 0.030 | 3.0 g | | 43,000 | 150,000 |
| 7 | 10 min/0° C. | propylene | | 0.020 | 4.0 g | | 67,000 | 210,000 |
| 8 | 60 min/25° C. | 1-hexene$^c$ | | 0.030 | 3.1 g | | 2,500 | 6,200 |
| 9 | 180 min/25° C. | ethylene | 0.17$^d$ | 0.050 | 2.8 g | 50 | 72,000 | 100,000 |
| 10 | 180 min/25° C. | ethylene | 0.32$^e$ | 0.060 | 2.6 g | 52 | 50,000 | 120,000 |

$^a$Concentration range of catalyst = 2.65–3.05 mM
$^b$By GPC in 1,2,4-trichlorobenzene vs. polystyrene standards.
$^c$Concentration of 1-hexene = 6.00M
$^d$Styrene
$^e$1-Hexene The method of the invention clearly demonstrates that a silane compound as disclosed can serve as an effective chain transfer agent in the polymerization of olefins using a metallocene-containing catalyst. Therefore, the molecular weight of the resulting polymer or copolymer can be controlled by adding the appropriate amount of the silane.

Furthermore, the instant method may be used to prepare novel silyl-terminated co-polymers wherein one terminus of the co-polymer is a silyl group preferably of the formula:

The silyl-terminated polymers or interpolymers produced according to the method of the present invention find utility in the preparation of block copolymers or star lock copolymers (e.g., when the silyl end group contains one or more reactive sites such as SiH) for application as polymer compatibilizers. They may also be used to modify the surface of plastics such as polyolefins for coating or adhesion purposes.

EXAMPLES

The following examples are presented to further illustrate the method of this invention, but are not to be construed as limiting the invention, which is delineated in the appended claims. All parts and percentages in the examples are on a weight basis and all measurements were obtained at 25° C. unless indicated to the contrary. The notation Ph is used to denote phenyl radical.

Example 1

In the glove box, 10 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4^-$ were loaded into a 100 mL round bottom flask. On the vacuum line, 50 mL of toluene was added to the flask via a syringe under an Ar counterflow. Next, 0.20 mL (2.0 mmol) of PhSiH$_3$ was vacuum transferred into the flask at −78° C. The mixture was then warmed to room temperature and exposed to propylene (1 atm) while rapidly stirring for 3 min. The reaction was next quenched by the addition of 2.0 mL of methanol. The polymer was collected by filtration and then extracted with n-pentane (50 mL). The polymer was isolated by evaporating the solvent and washing the product with methanol and acetone, followed by drying under vacuum. (Yield, 4.0 g; M$_n$=43,000, M$_w$=150,000 by GPC; $^1$H NMR (benzene-d$_6$, relative intensity); δ 7.50 (Ph, 0.2), 7.20 (Ph, 0.2), 4.48 (SiH$_2$, 0.2), 1.74 (—CH—, 31), 1.21 (—CH$_2$—, 63), 0.96 (—CH$_3$, 100), 0.78 (—CH$_2$—, 0.2). $^{13}$C NMR (C$_6$D$_6$, 75.5 Mhz): δ 136.2, 130.1, 129.8, 128.7, 47.4, 47.1, 46.7, 46.3, 45.9, 44.8, 32.3, 29.5, 27.8, 23.1, 21.3, 20.9, 20.6, 20.4, 20.0, 19.6, 14.5, 1.95.

Example 2

In the glove box, 10 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4^-$ were loaded into a 100 mL round bottom flask. On the vacuum line, 10 mL of toluene was added to the flask via syringe under an Ar counterflow. After evacuation, 0.40 mL (3.0 mmol) of PhSiH$_3$ and 7.5 mL (0.060 mol) of 1-hexene were then vacuum transferred into the flask at −78° C. The mixture was then warmed to room temperature while rapidly stirring for 60 min. The reaction was then quenched by the addition of 2.0 mL of methanol. The polymer was isolated by evaporating the solvent and then washing the product with methanol and acetone, followed by drying under vacuum. (Yield, 3.1 g; M$_n$=2,500, M$_w$=6,200 by GPC; $^1$H NMR (benzene-d$_6$, relative intensity); δ 7.50 (Ph, 0.2), 7.20 (Ph, 0.2), 4.48 (SiH$_2$, 0.2), 1.65 (—CH—, 9.6), 1.46 (—CH$_2$—, 100), 1.13 (—CH$_3$, 39). $^{13}$C NMR (C$_6$D$_6$, 75.5 MHz): δ 136.5, 136.2, 135.5, 129.6, 46.0, 45.6, 40.9, 35.7, 34.6, 32.9, 32.4, 29.2, 27.2, 25.1, 23.8, 23.4, 17.5, 16.9, 16.8, 14.5, 14.4, 10.4.

Example 3

In the glove box, 10 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4^-$ were loaded into a 100 mL round bottom flask. On the vacuum line, 10 mL of toluene was added to the flask via syringe under an Ar counterflow. Next, 0.70 mL (5.0 mmol) of PhSiH$_3$ and 2.0 mL (0.017 mol) of styrene were vacuum transferred into the flask at −78° C. The mixture was then warmed to room temperature and exposed to ethylene (1 atm) while rapidly stirring for 60 min. The reaction was quenched by the addition of 2.0 mL of methanol. The polymer was collected by filtration, and then washed with methanol and acetone, followed by drying under high vacuum. Yield, 2.78 g (50%). Polymer composition: atactic polystyrene having PhSiH$_2$ endcaps; M$_n$=72,000, M$_w$=100,000 by GPC. $^1$H NMR (C$_2$D$_2$Cl$_4$, 120° C.): δ 7.70–6.95 (m, Ph), 4.35 (m, SiH$_2$), 2.80–2.30 (m, —CH(Ph)—), 1.70–1.40 (m, —CH$_2$CHPh—), 1.40–0.90 (m, —CH$_2$CH$_2$—). $^{13}$C NMR (C$_2$D$_2$Cl$_4$, 75.5 MHz, 120° C.): δ 146.3, 145.8, 129.0, 128.0, 127.8, 127.6, 125.5, 41.0, 36.8, 34.3, 31.8, 29.6, 29.4, 27.5, 25.3, 24.2, 22.5, 13.7.

Example 4

In the glove box, 10 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4^-$ were loaded into a 100 mL round bottom flask. On the vacuum line, 10 mL of toluene was added to the flask via syringe under an Ar counterflow. After evacuation, 1.0 mL (6.0 mmol) of PhSiH$_3$ and 4.0 mL (0.032 mol) of 1-hexene were vacuum transferred into the flask at −78° C. The mixture was then warmed to room temperature and exposed to ethylene (1 atm) while rapidly stirring for 60 min. The reaction was then quenched by the addition of 2.0 mL of methanol. The polymer was collected by filtration and then washed with methanol and acetone, followed by drying under high vacuum. Yield, 2.56 g (52%), Polymer composition: poly(1-hexene) having PhSiH$_2$ endcaps; M$_n$=50,000, M$_w$=120,000 by GPC. $^1$H NMR (C$_2$D$_2$Cl$_4$, 120° C.): δ 7.50 (m, Ph), 7.20 (m, Ph), 4.49 (m, SiH$_2$), 1.18 (m, —CH—), 1.47 (m, —CH$_2$CH$_2$—). 1.03 (m, —CH$_3$). $^{13}$C NMR (C$_2$D$_2$Cl$_4$, 75.5 MHz, 120° C.): δ 136.2, 131.2, 129.7, 126.9, 45.0, 40.9, 40.3, 39.4, 39.0, 37.9, 35.3, 34.8, 34.6, 34.3, 33.9, 32.9, 32.4, 31.9, 30.7, 30.2, 29.2, 27.1, 23.7, 23.1, 20.7, 15.6, 14.5.

Example 5

In the glove box, 10 mg (0.030 mmol) of rac-ethylene diindenyl titanium dimethyl and 24 mg (0.026 mmol) of PhC$^+$B(C$_6$F$_5$)$_4^-$ were loaded into a 100 mL round bottom flask. On the vacuum line, 10 mL of toluene was added to the flask via syringe under an Ar counterflow. After evacuation, 1.0 mL (6.0 mmol) of PhSiH$_3$ was vacuum transferred into the flask at −78° C. The mixture was then warmed to −45° C. and exposed to propylene (1 atm) while rapidly stirring for 10 min. The reaction was then quenched by the addition of 2.0 mL of methanol. The polymer was collected by filtration, and then washed with methanol, acetone and n-hexane, followed by drying under high vacuum. (Yield, 0.040 g). The isotacticity is >94% (based on $^{13}$C NMR assay of mmmm pentad composition). M$_n$=8,200 by NMR. $^1$H NMR (C$_2$D$_2$Cl$_4$, 120° C.): δ 7.522 (m, Ph), 7.35 (m, Ph), 4.22 (m, SiH$_2$), 1.62 (m, (—CH—), 1.28 (m, (—CH$_2$—). 0.88 (m, —CH$_3$).

Example 6

In the glove box, 13 mg (0.057 mmol) of (C$_5$Me$_5$)TiMe$_3$ and 33 mg (0.036 mmol) of Ph$_3$C$^+$B(C$_6$F$_5$)$_4^-$ were loaded into a 100 mL round bottom flask. On the vacuum line, 10 mL of toluene was added to the flask via syringe under an Ar counterflow. The mixture was then warmed to 45° C. and 1.0 mL (6.0 mmol) of PhSiH$_3$ and 5 mL of styrene were injected via a syringe while stirring for 3 minutes. The reaction was then quenched by the addition of 2.0 mL of methanol. The polymer was collected by filtration, and then washed with methanol and acetone, followed by drying under high vacuum. (Yield, 4.48 g). The syndiotacticity is >98% (based on $^{13}$C NMR). M$_n$=52,000 by NMR. $^1$H NMR (C$_2$D$_2$Cl$_4$, 120° C.): δ 7.40–6.60 (m, Ph), 7.35 (m, Ph), 4.21 (m, SiH$_2$), 1.85 cm, (—CH—), 1.35 (m, (—CH$_2$—). 0.90 (d, —CH$_3$).

Example 7

In the glove box, 10 mg (0.027 mmol) of [Me$_2$Si(Me$_4$C$_5$)(t-BuN)]ZrMe$_2$ and 28 mg (0.030 mmol) of Ph$_3$C$^+$B(C$_6$F$_5$)$_4^-$ are loaded into a 100 mL round bottom flask. On the vacuum line, 50 mL of toluene is added to the flask via a syringe under an Ar counterflow. Next, 0.20 mL (2.0 mmol) of PhSiH$_3$ is vacuum transferred into the flask at −78° C. The mixture is then warmed to room temperature and exposed to propylene (1 atm) while rapidly stirring for 3 min. The reaction is next quenched by the addition of 2.0 mL of methanol. The polymer is collected by filtration and then extracted with n-pentane (50 mL). The polymer is isolated by evaporating the solvent and washing the product with methanol and acetone, followed by drying under vacuum.

Example 8

In the glove box, 10 mg (0.022 mmol) of [Me$_2$Si(Me$_4$C$_5$)(t-BuN)]HfMe$_2$ and 28 mg (0.030 mmol) of Ph$_3$C$^+$B(C$_6$F$_5$)$_4^-$ is loaded into a 100 mL round bottom flask. On the vacuum line, 10 mL of toluene is added to the flask via syringe under an Ar counterflow. After evacuation, 0.40 mL (3.0 mmol) of PhSiH$_3$ and 7.5 mL (0.060 mol) of 1-hexene is then vacuum transferred into the flask at −78° C. The mixture is then warmed to room temperature while rapidly stirring for 60 min. The reaction is then quenched by the addition of 2.0 mL of methanol. The polymer is isolated by evaporating the solvent and then washing the product with methanol and acetone, followed by drying under vacuum.

Example 9

In the glove box, 10 mg (0.031 mmol) of [Me$_2$Si(Me$_4$C$_5$)(t-BuN)]TiMe$_2$ and 28 mg (0.030 mmol) of Ph$_3$C$^+$ B(C$_6$F$_5$)$_4^-$ was loaded into a 100 mL round bottom flask. On the vacuum line, 50 mL of toluene was added to the flask via a syringe under an Ar counterflow. Next, 0.40 mL (2.6 mmol) of 1,4-disilybenzene is vacuum transferred into the flask at −78° C. The mixture is then warmed to room temperature and exposed to polypropylene (1 atm) while rapidly stirring for 5 min. The reaction was next quenched by the addition of 2.0 mL of methanol. The polymer was collected by filtration and then extracted with n-pentane (50 mL). The polymer was isolated by evaporating the solvent and washing the product with methanol and acetone, followed by drying under vacuum. (Yield, 3.0 g; M$_n$=190,000, M$_w$=330,600 by GPC; $^1$H NMR (benzene-d$_6$); δ 7.50 (Ph, m), 7.20 (Ph, m), 4.47 (SiH$_2$, m), 1.74 (—CH—, br), 1.21 (—CH$_2$—, br), 0.96 (—CH$_3$, br), 0.78 (—CH$_2$—, br).

Example 10

In the glove box, 10 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4^-$ is loaded into a 100 mL round bottom flask. On the vacuum line, 50 mL of toluene is added to the flask via a syringe under an Ar counterflow. Next, 0.50 g (3.0 mmol) of 1,3,5-trisilybenzene is transferred by syringe into the flask at −78° C. The mixture is then warmed to room temperature and exposed to polypropylene (1 atm) while rapidly stirring for 5 min. The reaction is next quenched by the addition of 2.0 mL of methanol. The polymer is collected by filtration and then extracted with n-pentane (50 mL). The polymer is isolated by evaporating the solvent and washing the product with methanol and acetone, followed by drying under vacuum.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed is:

1. A process for polymerizing α-olefins (3≦C≦10) with silanes as chain-transfer agents preparing and forming a silyl-terminated homopolymer comprising:

mixing
        (A) an α-olefin (3≦C≦10);
        (B) a silane;
        (C) and a catalyst comprising a metallocene compound with a formula of Cp$_m$MX$_n$Y$_p$ or CpMX$_d$ and a co-catalyst or

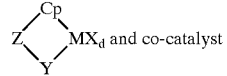
MX$_d$ and co-catalyst wherein

Cp denotes a cyclopentadienyl radical;

Z is SiR*$_2$, CR*$_2$, SiR$_2$SiR*$_2$SiR*$_2$, CR*$_2$CR*$_2$, CR*=CR*, CR*$_2$SiR*$_2$, GeR*$_2$, SnR$_2$*;

R,R* is selected from the group consisting of alkyl radicals having 1 to 4 carbon atoms, aryl radicals and methoxy;

M is a metal selected from the group consisting of Ti, Hf, and Zr;

X is an inert anionic organic ligand (C≦20);

Y is a heteroatom ligand, selected from the group consisting of —O—, —S—, —NR*—, —PR*— and a neutral two electron donor ligand selected from the group consisting of —CR*, —SR*, —NR*$_2$ and —PR*$_2$;

n and m are integers, (n≦3, m≦4) such that (m+n)=the valence of said metal M;

p is 1 or 2;

d is 1 or 2;

said co-catalyst is acidic thereby forming a homopolymer consisting essentially of polymerized monomers (3≦C≦10) with a silyl termination.

2. The process of claim 1, wherein said catalyst consists essentially of a combination of said metallocene compound and a co-catalyst selected from the group consisting of an alkylalumoxane, a trialkyl boron compound in which the alkyl radicals have 1 to 8 carbon atoms, a triaryl boron compound having 6 to 8 carbon atoms, a borate reagent of R$_3$N$^+$BR$_4^-$ or (C$_6$H$_5$)$_3$C$^+$BR$_4^-$, and a compound of the formula AlG$_k$R$^5$$_{(3-k)}$ in which G is selected from the group consisting of hydrogen, halogen, alkyl radicals having 1–8 carbon atoms, and aryl radicals having 6 to 8 carbon atoms, R$^5$ is an alkyl radical having 1–8 carbon atoms and k is an integer having a value of 0 to 3.

3. The process according to claim 1, wherein said olefin is propylene, hexene or styrene.

4. The process according to claim 1, wherein said process is conducted in a solvent selected from the group consisting of toluene, butane, pentane, hexane, octane and iso-octane.

5. The process according to claim 1, wherein said olefin is a combination of compounds selected from the group consisting of propylene, styrene, 1-butene, 1-octene and 1-hexene.

6. The process according to claim 1 further including the step of cooling said monomer and said silane to about −78° C. in the presence of said catalyst.

7. The process according to claim 1, wherein said silane is selected from the group consisting of phenylsilane, diphenylsilane, phenylmethylsilane, pentamethyldisiloxane, methylsilane and dimethylsilane.

8. The process according to claim 1, wherein silane has the formula $R(SiR^2R^3R^4)_n$, wherein R is H, a hydrocarbon ($1 \leq C \leq 10$), or silyl group each having a valence equal to n and at least one of $R^2$, $R^3$, and $R^4$ is H, and the other of $R^2$, $R^3$ and $R^4$ is a monovalent group independently selected from the group consisting of:

hydrogen, alkyl radicals, aryl radicals, alkylaryl radicals, arylalkyl radicals, alkoxy radicals ($1 \leq C \leq 20$ for all radicals);

phenoxy radical, fluorinated alkyl radicals ($3 \leq C \leq 6$), dialkylamino group in which the alkyl groups contain 1 to 4 carbon atoms, and a diorganopolysiloxane chain containing 1 to 10 siloxane units; and n=1–6 and when R is H, n is 1.

9. A polymer of an α-olefin ($3 \leq C \leq 10$), wherein a terminus of said polymer is a silyl group of the formula $R(SiR^2R^3R^4)_n$, wherein R is H, a hydrocarbon ($1 \leq C \leq 10$), or silyl group each having a valence equal to n and at least one of $R^2$, $R^3$, and $R^4$ is H, and the other of $R^2$, $R^3$ and $R^4$ is a monovalent group independently selected from the group consisting of:

hydrogen, alkyl radicals, aryl radicals, alkylaryl radicals, arylalkyl radicals, alkoxy radicals ($1 \leq C \leq 20$ for all radicals);

phenoxy radical, fluorinated alkyl radicals ($3 \leq C \leq 6$), dialkylamino group in which the allyl groups contain 1 to 4 carbon atoms, and a diorganopolysiloxane chain containing 1 to 10 siloxane units; and n=1–6 and when R is H, n is 1.

10. The polymer according to claim 9, wherein said α-olefin is selected from the group consisting of styrene, propene, and 1-hexene.

11. The polymer according to claim 9, wherein $R^2$, $R^3$ and $R^4$ are independently selected from the group consisting of hydrogen, methyl, and phenyl.

12. The process of claim 1, wherein said catalyst consists essentially of a combination of said metallocene compound and a co-catalyst selected from the group consisting of an alkylalumoxane, a trialkyl boron compound in which he alkyl radicals have 1 to 8 carbon atoms, a triaryl boron compound with aryl radicals having 6 to 8 carbon atoms, a borate reagent of $R_3NH^+BR_4^-$ or $Ph_3C^+BR_4^-$ and a compound of the formula $AlG_kR^5_{(3-k)}$ in which G is selected from the group consisting of hydrogen, halogen, alkyl radicals having 1–8 carbon atoms, and aryl radicals having 6 to 8 carbon atoms, $R^5$ is an alkyl radical having 1–8 carbon atoms and k is an integer having a value of 0 to 3.

13. The process of claim 12, wherein said silane is selected from the group consisting of phenylsilane, diphenylsilane, phenylmethylsilane, pentamethyldisiloxane, methylsilane and dimethylsilane.

14. A process for polymerizing α-olefins ($3 \leq C \leq 10$) with silanes as chain transfer agents to form a silyl-terminated polyolefin comprising:

mixing (A) an α-olefin ($3 \leq C \leq 10$);

(B) a silane having the formula $R(SiR^2R^3R^4)_n$ wherein R is H, a hydrocarbon ($1 \leq C \leq 10$), or silyl group each having a valence equal to n and at least one of $R^2$, $R^3$, and $R^4$ is H, and the other of $R^2$, $R^3$ and $R^4$ is a monovalent group independently selected from the group consisting of:

hydrogen, alkyl radicals, aryl radicals, alkylaryl radicals, arylalkyl radicals, alkoxy radicals ($1 \leq C \leq 20$ for all radicals);

phenoxy radical, fluorinated alkyl radicals ($3 \leq C \leq 6$), dialkylamino group in which the alkyl groups contain 1 to 4 carbon atoms, and a diorganopolysiloxane chain containing 1 to 10 siloxane units; and n=1–6 and when R is H, n is 1;

(C) adding a catalyst comprising a metallocene compound with a formula of $Cp_mMX_nY_p$ and co-catalyst or

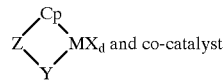 and co-catalyst wherein

Cp denotes a cyclopentadienyl, a substituted cyclopentadienyl radical, or a fused cyclopentadienyl radical;

M is Ti, Zr or Hf;

Z is $SIR^*_2$, $CR^*_2$, $SiR_2SiR^*_2SiR^*_2$, $CR^*_2CR^*_2$, $CR^*=CR^*$, $CR^*_2SiR^*_2$, $GeR^*_2$, $SnR_2^*$;

wherein:

X is an inert anionic organic ligand ($C \leq 20$);

Y is a heteroatom ligand, selected from the group consisting of —O—, —S—, —NR*—, —PR*— and a neutral two electron donor ligand selected from the group consisting of —CR*, —SR*, —NR*$_2$ and —PR*$_2$;

R,R*, each occurrence, is independently selected from the group consisting of hydrogen, alkyl, aryl, silyl, halogenated alkyl, halogenated aryl groups having up to 20 carbon or non-hydrogen atoms, and mixtures thereof, or two or more R* groups from Y, Z or both Y and Z form a fused ring system;

n and m are integers, each having a value of 1 to 3 such that (m+n) is selected to satisfy the valence of said metal M;

p is 1 or 2;

d is 1 or 2; and said co-catalyst is acidic; and (D) forming a silyl-capped homopolymer.

15. A process for polymerizing an a α-olefin ($3 \leq C \leq 10$), with silanes as chain transfer agents, comprising:

mixing (A) an α-olefin ($3 \leq C \leq 10$);

(B) a silane having the formula $R(SiR^2R^3R^4)_n$ wherein R is H, a hydrocarbon ($1 \leq C \leq 10$), or silyl group each having a valence equal to n and at least one of $R^2$, $R^3$, and $R^4$ is H, and the other of $R^2$, $R^3$ and $R^4$ is a monovalent group independently selected from the group consisting of:

hydrogen, alkyl radicals, aryl radicals, alkylaryl radicals, arylalkyl radicals, alkoxy radicals ($1 \leq C \leq 20$ for all radicals);

phenoxy radical, fluorinated alkyl radicals ($3 \leq C \leq 6$), dialkylamino group in which the alkyl groups contain 1 to 4 carbon atoms, and a diorganopolysiloxane chain containing 1 to 10 siloxane units and n=1–6 and when R is H, n is 1;

(C) and a catalyst comprising a metallocene compound with a formula of $Cp_mMX_nY_p$ and co-catalyst or

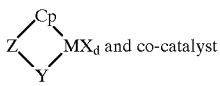

wherein

Cp denotes a cyclopentadienyl radical;

Z is $SiR*_2$, $CR*_2$, $SiR_2SiR*_2SiR*_2$, $CR*_2CR*_2$, $CR*{=}CR*$, $CR*_2SiR*_2$, $GeR*_2$, or $SnR_2*$;

M is Ti, Hf, or Zr;

X is methyl;

Y is a heteroatom ligand, selected from the group consisting of —O—, —S—, —NR*—, —PR*— and a neutral two electron donor ligand selected from the group consisting of SR*CR*, SR*SR*, SR*NR*$_2$ and SR*PR*$_2$;

R,R* is selected from the group consisting of alkyl radicals having 1 to 4 carbon atoms, aryl radicals and methoxy;

n and m are integers, ($n \leq 3$, $m \leq 4$) such that (m+n)=the valence of said metal M;

p is 1 or 2;

d is 1; and said co-catalyst is acidic and thereby forming a silyl-capped homopolymer consisting essentially of polymerized monomers ($3 \leq C \leq 10$).

* * * * *